(12) United States Patent
Prakash et al.

(10) Patent No.: US 12,182,032 B2
(45) Date of Patent: Dec. 31, 2024

(54) MEMORY MIGRATION AND PAGE FAULT AVOIDANCE

(71) Applicant: Google LLC, Mountain View, CA (US)

(72) Inventors: Prashanth Prakash, Santa Clara, CA (US); Jerome Charles Jean Glisse, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 18/136,096

(22) Filed: Apr. 18, 2023

(65) Prior Publication Data

US 2024/0354257 A1 Oct. 24, 2024

(51) Int. Cl.
*G06F 12/1009* (2016.01)
*G06F 12/0817* (2016.01)

(52) U.S. Cl.
CPC ...... *G06F 12/1009* (2013.01); *G06F 12/0822* (2013.01)

(58) Field of Classification Search
CPC .......................... G06F 12/1009; G06F 12/0822
See application file for complete search history.

(56) References Cited

U.S. PATENT DOCUMENTS

| | | | |
|---|---|---|---|
| 11,620,233 B1 | 4/2023 | Habusha et al. | |
| 2010/0058358 A1* | 3/2010 | Franke | G06F 12/1027 718/1 |
| 2014/0052948 A1* | 2/2014 | Qiu | G06F 3/067 711/162 |
| 2015/0278109 A1* | 10/2015 | Vahidsafa | G06F 11/141 711/206 |
| 2018/0157437 A1 | 6/2018 | Sandberg et al. | |
| 2018/0321964 A1* | 11/2018 | Tsuji | G06F 9/45558 |
| 2020/0125488 A1* | 4/2020 | Byun | G06F 12/10 |
| 2020/0159556 A1 | 5/2020 | Chandrappa et al. | |
| 2020/0250092 A1* | 8/2020 | Szeredi | G06F 12/0897 |
| 2020/0327048 A1* | 10/2020 | McClure | G06F 12/1027 |
| 2022/0156106 A1* | 5/2022 | Zhang | G06F 9/5016 |
| 2023/0325106 A1* | 10/2023 | Shveidel | G06F 3/0638 711/202 |

OTHER PUBLICATIONS

International Search Report ad Written Opinion for International Application No. PCT/US2024/017848 dated May 29, 2024. 15 pages.

* cited by examiner

*Primary Examiner* — Sean D Rossiter
(74) *Attorney, Agent, or Firm* — Lerner David LLP

(57) ABSTRACT

Accessing information associated with a virtual memory address by receiving a virtual memory address, translating the virtual memory address into a nominal physical memory address, receiving the nominal physical memory address at a memory migrator, and using the memory migrator to determine an old physical memory address corresponding to the nominal physical memory address and access the information at the old physical memory address or a new physical memory address. The accessing operation may be performed as part of migrating the information from an old physical memory location corresponding the old physical memory address to a new physical memory location corresponding to the new physical memory address.

10 Claims, 4 Drawing Sheets

MEMORY MIGRATION AND PAGE FAULT AVOIDANCE

BACKGROUND

Computer processing systems may access stored information through the use of virtual memory addresses. The virtual memory addresses are mapped to physical memory addresses, often through the use of one or more page tables in which the virtual addresses are cross-referenced to respective physical addresses. For information associated with a given virtual address, the memory storage location of the information is the location indicated by the physical address mapped to the given virtual address.

In systems employing virtual memory addresses, the memory storage locations of information associated with the virtual memory addresses may be migrated. When information is migrated from one memory location to another (i.e., when "memory is migrated"), the memory storage locations of the information are changed without changing the virtual addresses of the information. After migration, the information may be accessed by changing the mapping for the virtual addresses from mapping to old physical memory addresses, corresponding to the old storage locations, to mapping to new physical memory addresses corresponding to the new storage locations, e.g., by editing a page table to substitute the new physical memory addresses for the old physical memory addresses. In this manner, the physical memory locations at which information is stored may be changed while the virtual addresses of the information appear the same to an application or input-output (IO) device seeking to access the information. Thereby, the application or IO device can consistently access the information by referencing the virtual addresses, without concern for the physical locations of the information. However, if an attempt is made to access information that is mapped to a new physical address before the information has been moved from the old physical location to the new physical location a so-called page fault occurs. That is, when an application or IO device directs an access request for information at a virtual address whose physical memory is being migrated from the old memory address to new memory address, the virtual address cannot be mapped to either old or new physical address while providing data consistency, and thus the page table for such a virtual address is left empty giving rise to a page fault.

BRIEF SUMMARY

It has been recognized that there is a growing desire to migrate physical memory in systems employing virtual memory addresses so as to realize the advantages conferred by migrating physical memory. It has been further recognized, that in view of the increased desire to migrate physical memory, the elimination of page faults has become increasingly important.

In view of the desire to allow virtual memory systems to readily migrate physical memory without the occurrence of page faults, the presently disclosed technology is provided.

In one aspect, the presently disclosed technology provides a method for accessing information associated with a virtual memory address including receiving a virtual memory address; translating the virtual memory address into a nominal physical memory address; receiving the nominal physical memory address at a memory migrator; and using the memory migrator to determine an old physical memory address corresponding to the nominal physical memory address and access the information at the old physical memory address.

In another aspect, the presently disclosed technology provides a system for accessing information associated with a virtual memory address including one or more processor cores; at least one memory management unit for receiving a virtual memory address and translating the virtual memory address into a nominal physical memory address; and a memory migrator for receiving the nominal physical memory address, determining an old physical memory address corresponding to the nominal physical memory address, and accessing the information at the old physical memory address.

In still another aspect, the presently disclosed technology provides a method for performing migration of information associated with a virtual memory address from storage in an old physical memory location corresponding to an old physical memory address to a new physical memory location corresponding to a new physical memory address including revising a page table cross-referencing the virtual memory address with the old physical memory address to cross-reference the virtual memory address with a nominal physical memory address: copying the information from the old physical memory location to the new physical memory location; and when accessing the information using the virtual memory address after revising the page table and before copying the information from the old physical memory location to the new physical memory location using the page table to translate the virtual memory address into the nominal physical memory address, receiving the nominal physical memory address at a memory migrator, using the memory migrator to determine the old physical memory address based on the nominal physical memory address, and accessing the information at the old physical memory address; and when accessing the information using the virtual memory address after revising the page table and after copying the information from the old physical memory location to the new physical memory location using the page table to translate the virtual memory address into the new physical memory address or using the memory migrator to determine the new physical memory address based on the nominal physical memory address, and accessing the information at the new physical memory address.

BRIEF DESCRIPTION OF THE DRAWINGS

The accompanying drawings are not intended to be drawn to scale. Also, for purposes of clarity not every component may be labeled in every drawing. In the drawings.

DETAILED DESCRIPTION

Examples of systems and methods are described herein. It should be understood that the words "example," "exemplary" and "illustrative" are used herein to mean "serving as an example, instance, or illustration." Any embodiment or feature described herein as being an "example," "exemplary" or "illustration" is not necessarily to be construed as preferred or advantageous over other embodiments or features. In the following description, reference is made to the accompanying figures, which form a part thereof. In the figures, similar symbols typically identify similar components, unless context dictates otherwise. Other embodiments may be utilized, and other changes may be made, without departing from the spirit or scope of the subject matter presented herein.

The example embodiments described herein are not meant to be limiting. It will be readily understood that the aspects of the present disclosure, as generally described herein, and illustrated in the figures, can be arranged, substituted, combined, separated, and designed in a wide variety of different configurations, all of which are explicitly contemplated herein.

The presently disclosed technology concerns moving mapped memory while avoiding page faults. Two of the embodiments of the technology include a processor-based embodiment and a coherent-memory-device-based embodiment. In each of the processor-based and coherent-memory-device-based embodiments, a hardware element referred to as a memory migrator is used to carry out memory migration. In the processor-based embodiment, the memory migrator is located in, or is an integral part of, a processor. In the coherent-memory-device-based embodiment, the memory migrator is located in, or is an integral part of, a coherent memory device connected to a processor. In its simplest form a memory migrator contains redirection hardware logic to redirect accesses from one address (OldHPA) to another (NewHPA) and a copy-engine hardware logic to copy contents between those addresses. Given these two functionalities (access redirection and copy) are part of the same hardware block, the block is able to correctly direct the access from an application or IO device to the correct address, thereby maintaining memory consistency.

Figure 1:
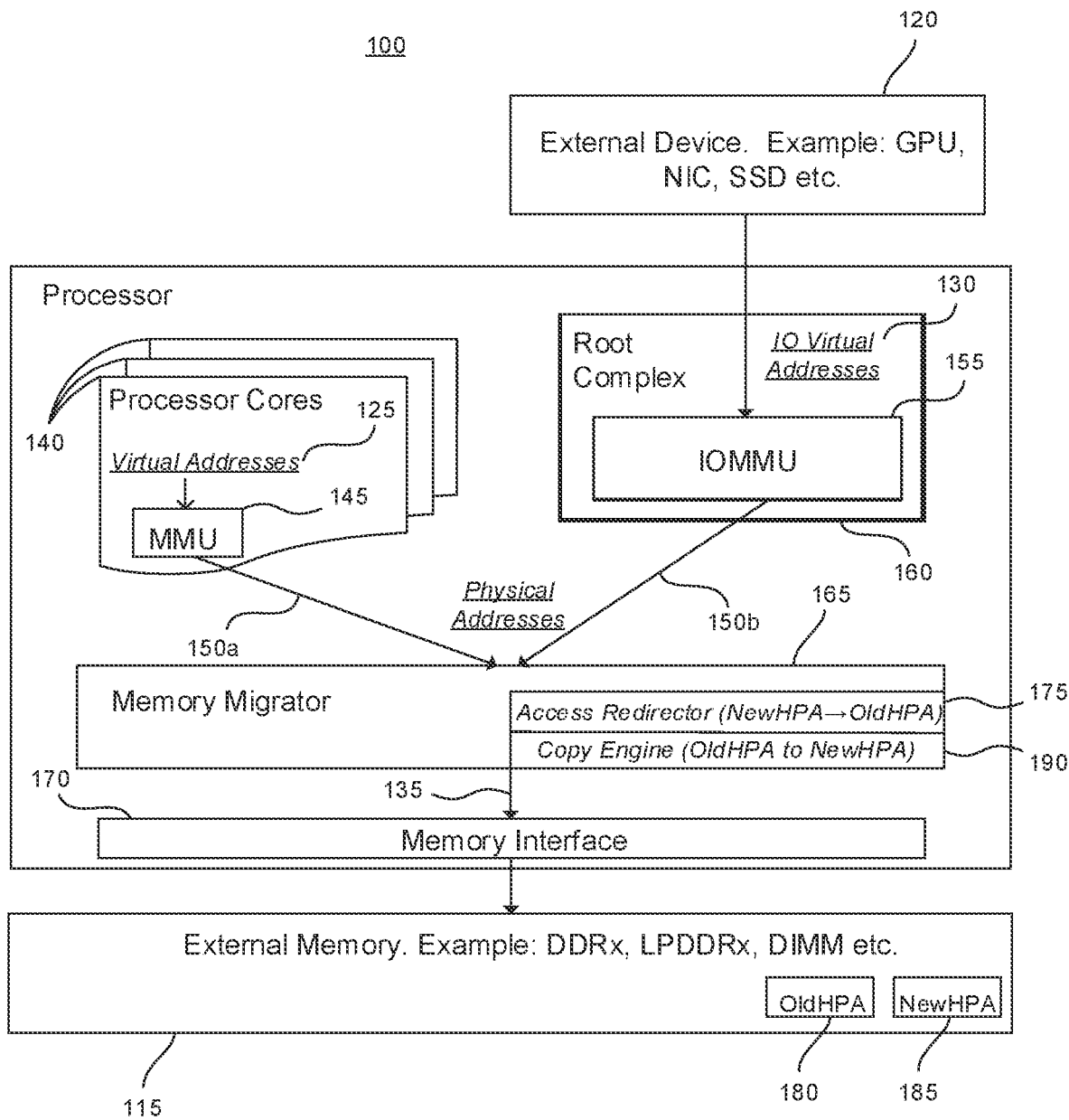
FIG. 1 is a block diagram of an example computing system in which the presently disclosed technology may be implemented.

Turning now to FIG. 1, the figure is a block diagram of an example computing system 100 in which the presently disclosed technology may be implemented. As can be seen from the figure, the computing system 100 may include a processor 110, an external memory 115 coupled to the processor 110, and an external device 120 coupled to the processor 110. By way of example, the processor 110 may be a central processing unit (CPU), although the processor 110 may take the form of a CPU with one or more peripherals. The external memory 115 may be, for example, a double data rate (DDRx) memory, a low power DDRx (LPDDRx), a dual in-line memory module (DIMM), or the like. The external device 120 may be, for example, a graphics processing unit (GPU), a network interface controller (NIC), a solid-state drive (SSD), or the like. Moreover, while only a single external memory 115 and a single external device 120 are included in FIG. 1 for purposes of clarity of description, a computing system of the invention may include more than one external memory (herein referred to as "external memories 115" and/or more than one external device (herein referred to as "external devices 120").

In the computing system 100, the processor 110 is operable to translate virtual addresses into physical addresses. More specifically, the processor 110 is operable to generate virtual addresses 125 or receive input/output (IO) virtual addresses 130 from external device 120, and translate the generated virtual addresses 125 or received virtual addresses 130, as the case may be, into physical addresses 135 corresponding to physical memory locations in external memory 115. In the case of generated virtual addresses 125, such addresses may be generated according to an application running on one or more processor cores 140 of the processor 110, and passed to a memory management unit (MMU) 145 of the processor cores 140 where they are cross-referenced to nominal physical addresses 150a through use of one or more page tables. The nominal physical addresses 150a are used to access corresponding locations within the external memory 115. In the case of received virtual addresses 130, such addresses may be generated according to the programming of an external device 120, and passed to an input-output memory management unit (IOMMU) 155 which is part of a root complex 160 within the processor 110 where they are cross-referenced to nominal physical addresses 150b through use of one or more page tables. The nominal physical addresses 150b are used to access corresponding locations within the external memory 115. The nominal physical addresses 150a and the nominal physical addresses 150b are passed to a memory migrator 165 within processor 110. The memory migrator 165 is operable to either use the nominal physical addresses 150a and 150b as physical addresses 135, or use the nominal physical addresses 150a and 150b as a basis for determining physical addresses 135. The physical addresses 135 may then, in turn, be used to access locations in external memory 115 via a memory interface 170 of the processor 110.

To illustrate memory access operation of the memory migrator 165, four comparative examples are provided.

In a first example, an application running on processor cores 140 generates a virtual address 125 for data desired to be read and the data is stored in external memory 115. The virtual address 125 is translated by MMU 145 into a nominal physical address 150a, and the nominal physical address 150a is used by memory migrator 165 as a physical address 135 corresponding to the location of the data in external memory 115. The memory migrator 165 then reads the data from the physical address 135 of external memory 115 via memory interface 170.

In a second example, as in the first example, an application running on processor cores 140 generates a virtual address 125 for data desired to be read and the data is stored in external memory 115. However, in the second example an access redirection is necessary. More specifically, in the second example the virtual address 125 is translated by MMU 145 into a nominal physical address 150a, and the nominal physical address 150a is not the actual physical address 135 of the data, but rather, is used by the memory migrator 165 to determine the actual physical address 135 of the data. In this regard, the memory migrator 165 uses an access redirection block 175, in the form of hardware, software, or a combination of hardware and software, to translate the nominal physical address 150a into a physical address 135 that is different from the nominal physical address 150a, and the memory migrator 165 then reads the data from the physical address 135 of external memory 115 via memory interface 170.

In a third example, an external device 120 generates a virtual address 130 for data desired to be read and the data is stored in external memory 115. The virtual address 130 is translated by IOMMU 155 into a nominal physical address 150b, and the nominal physical address 150b is used by memory migrator 165 as a physical address 135 corresponding to the location of the data in external memory 115. The memory migrator 165 then reads the data from the physical address 135 of external memory 115 via memory interface 170.

In a fourth example, as in the third example, an external device 120 generates a virtual address 130 for data desired to be read and the data is stored in external memory 115. However, in the fourth example an access redirection is necessary. More specifically, in the fourth example the virtual address 130 is translated by IOMMU 155 into a nominal physical address 150b, and the nominal physical address 150b is not the actual physical address 135 of the data, but rather, is used by the memory migrator 165 to determine the actual physical address 135 of the data. In this regard, the memory migrator 165 uses an access redirection block 175, in the form of hardware, software, or a combination of hardware and software, to translate the nominal physical address 150b into a physical address 135 that is different from the nominal physical address 150b, and the memory migrator 165 then reads the data from the physical address 135 of external memory 115 via memory interface 170.

The access redirection block 175 of memory migrator 165 may be used to facilitate migration of memory in external memory 115, or between external memories 115, while avoiding page faults. To perform memory migration of information from old physical addresses 180 in one or more external memories 115 to new physical addresses 185 in one or more external memories 115, the memory migrator 165 may include a copy engine block 190 in the form of hardware, software, or a combination of hardware and software.

Figure 2:
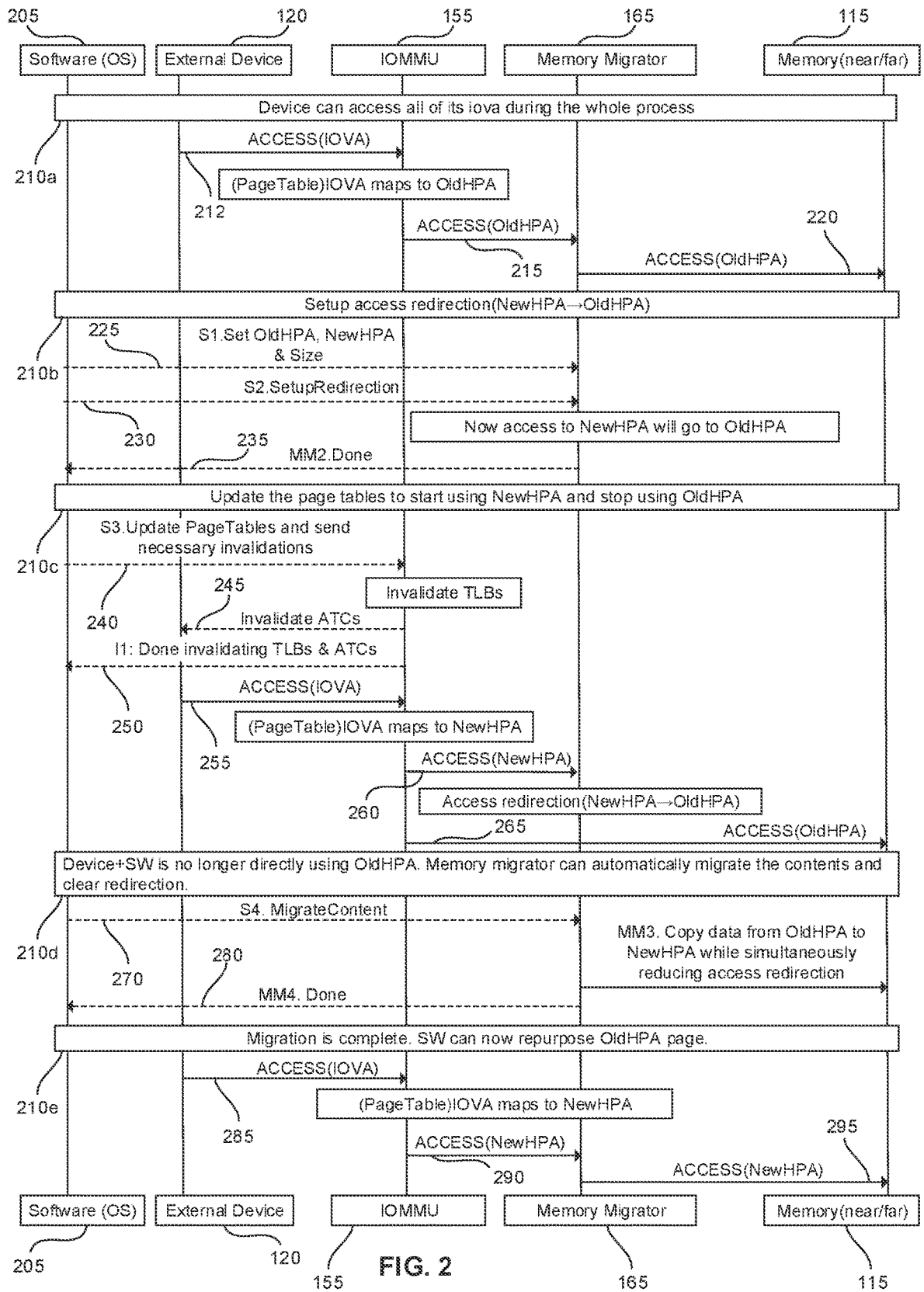
FIG. 2 is a signal flow diagram showing an illustrative flow of signals among selected elements of the FIG. 1 system before a memory migration is started, during the memory migration, and after the memory migration is complete.

Memory migration in the context of the FIG. 1 embodiment will be discussed in connection with FIG. 2. FIG. 2 is a signal flow diagram showing an illustrative flow of signals among selected elements of the FIG. 1 computing system 100 before a memory migration is started, during the memory migration, and after the memory migration is complete. More specifically, FIG. 2 shows an illustrative flow of signals among operating system software 205 running on processor cores 140, external device 120, IOMMU 155, memory migrator 165, and external memory or memories 115. The signal flows are depicted during a time period before migration (time period 210a), a time period during which an access redirection is set up (time period 210b), a time period during which page tables of the IOMMU 155 are updated (time period 210c), a time period during which information is moved from old memory locations to new memory locations (time period 210d), and a time period when migration is complete (time period 210e). The time periods 210b, 210c, and 210d in combination define the time period of the memory migration.

Regarding the time period 210a, the external device 120 may send a virtual address to the IOMMU 155 (signal 212). The IOMMU 155 maps the received virtual address to a physical address currently assigned to the virtual address (i.e., the "OldHPA") using, for example, a page table, and sends the OldHPA to the memory migrator 165 (signal 215). The memory migrator 165, then accesses the external memory 115 at the address indicated by OldHPA (signal 220)).

Next, the operating system software 205 receives or generates a command to perform a memory migration and the time period 210b begins. For instance, a command to perform a memory migration may be generated in response to user input, received from another device coupled to the processor 110, generated by the processor 110 in response to metrics received from another device or devices, or generated by processor 110 in response to processor memory monitoring operations. Moreover, the command to perform memory migration may be generated for any number of reasons, including moving frequently accessed information from low cost/low performance memory (i.e., "far memory") to high performance/high cost memory (i.e., "near memory"), moving infrequently accessed information from near memory to far memory, or moving information for purposes of memory defragmentation.

In any event, as a first step of performing the memory migration the operating system software 205 informs the memory migrator 165 of the parameters for the migration. That is, the operating system software 205 informs the memory migrator 165 of the current physical memory addresses from which information is to be migrated (OldHPA), the new physical memory addresses to which the information is to be migrated (NewHPA), and the size of the migration (signal 225). Then, operating system software 205 informs the memory migrator 165 to set up redirection from the NewHPA to the OldHPA (signal 230). The memory migrator 165, in turn, informs that operating system software 205 when redirection setup is complete (signal 235).

The redirection from NewHPA to OldHPA helps maintain accuracy of data/information (from an application or IO device perspective) and avoids page faults that typically occur when virtual addresses are remapped from an OldHPA to a NewHPA before the information stored at the memory locations indicated by the OldHPA has been moved to the memory locations indicated by the NewHPA. By contrast, the typical prior way of moving such memory while maintaining data accuracy involves (1) unmapping the virtual address to OldHPA, (2) moving the data from OldHPA to NewHPA, and (3) mapping the virtual address to NewHPA, so that any virtual address access occurring between (1) and (3) can cause a page fault which the application or device may not be able to handle. If a virtual address is translated to a New HPA, and the NewHPA is accessed before the information has been moved to the NewHPA the information retrieved in connection with the virtual address is not the intended information, which is still stored at the OldHPA. Rather, the information retrieved in connection with the virtual address is whatever information may be stored at the NewHPA before migration. Thus, in the presently disclosed technology, until the information is moved from OldHPA to NewHPA, any translations that yield a NewHPA are redirected to OldHPA. Accordingly, redirection is set up such that remapping from OldHPA to NewHPA can be done without waiting for the movement of information from OldHPA to NewHPA. Accordingly, once redirection is complete the time period 210c begins.

As an initial operation during time period 210c, the operating system software 205 instructs the IOMMU 155 to start using the NewHPA instead of the OldHPA. For example, the operating system software 205 instructs the IOMMU 155 to revise its page tables and invalidate certain caches (signal 240). As a more specific example, the operating system software 205 may instruct the IOMMU 155 to revise its page tables to map virtual addresses to NewHPA instead of OldHPA, and to carry out invalidations of the IOMMU 155 translation lookaside buffer (TLB) and the external device 120 address translation cache (ATC). In response, the IOMMU 155 invalidates its TLB, instructs the external device 120 to invalidate its ATC (signal 245), and informs the operating system software 205 when the TLB and ATC have been invalidated (signal 250). Now, when the external device 120 sends a virtual address to the IOMMU 155 (signal 255) the IOMMU 155 maps the received virtual address to a new physical address assigned to the virtual address (i.e., the NewHPA) using, for example, a page table, and sends the NewHPA to the memory migrator 165 (signal 260). The memory migrator 165 then determines the OldHPA corresponding to the NewHPA, e.g., by using a table to cross-reference the NewHPA to the OldHPA, and accesses the desired information in the external memory 115 at the OldHPA (signal 265).

Further, once the redirection from NewHPA to OldHPA has been set up, and the virtual addresses have been remapped to the NewHPA, movement of information from locations indicated by OldHPA to locations indicated by NewHPA may begin. That is, time period 210d may begin anytime after the invalidations of TLBs and ATCs are complete. To initiate movement of the information from locations indicated by OldHPA to locations indicated by NewHPA, the operating system software 205 instructs the memory migrator 165 to copy the information (i.e., "migrate the content") (signal 270). In response, the memory migrator 165 copies the information from OldHPA to NewHPA, while simultaneously reducing access redirection (signal 275). Reducing access redirection for a given OldHPA-NewHPA pair is performed after movement of the corresponding information because such redirection is no longer necessary. That is, for a given virtual address, when information associated with the virtual address has been moved form a location associated with an OldHPA to a location associated with a NewHPA, and the external device 120 attempts to access the information by providing a virtual address to the IOMMU 155, the IOMMU 155 will translate the virtual address to the NewHPA, which may be used without redirection to the OldHPA because the information has already been moved from the OldHPA to the NewHPA. Moreover, the copying of information from OldHPA to NewHPA and the corresponding reduction in access redirection will be performed atomically with appropriate granularity (e.g., on a byte-byte basis, or cache-line width basis). In any case, upon completion of all the movement necessary to complete the migration, and all attendant reductions in access redirection, the memory migrator 165 sends an indication to the operating system software 205 that the migration is complete (signal 280)).

Upon completion of migration, time period 210e begins. In time period 210e, operation is like that of time period 210a, but with NewHPA having taken the place of OldHPA. More specifically, in time period 210e, the external device 120 may send a virtual address to the IOMMU 155 (signal 285). The IOMMU 155 maps the received virtual address to the NewHPA assigned to the virtual address using, for example, a page table, and sends the NewHPA to the memory migrator 165 (signal 290). The memory migrator 165, then accesses the external memory 115 at the address indicated by NewHPA (signal 295).

Figure 3:
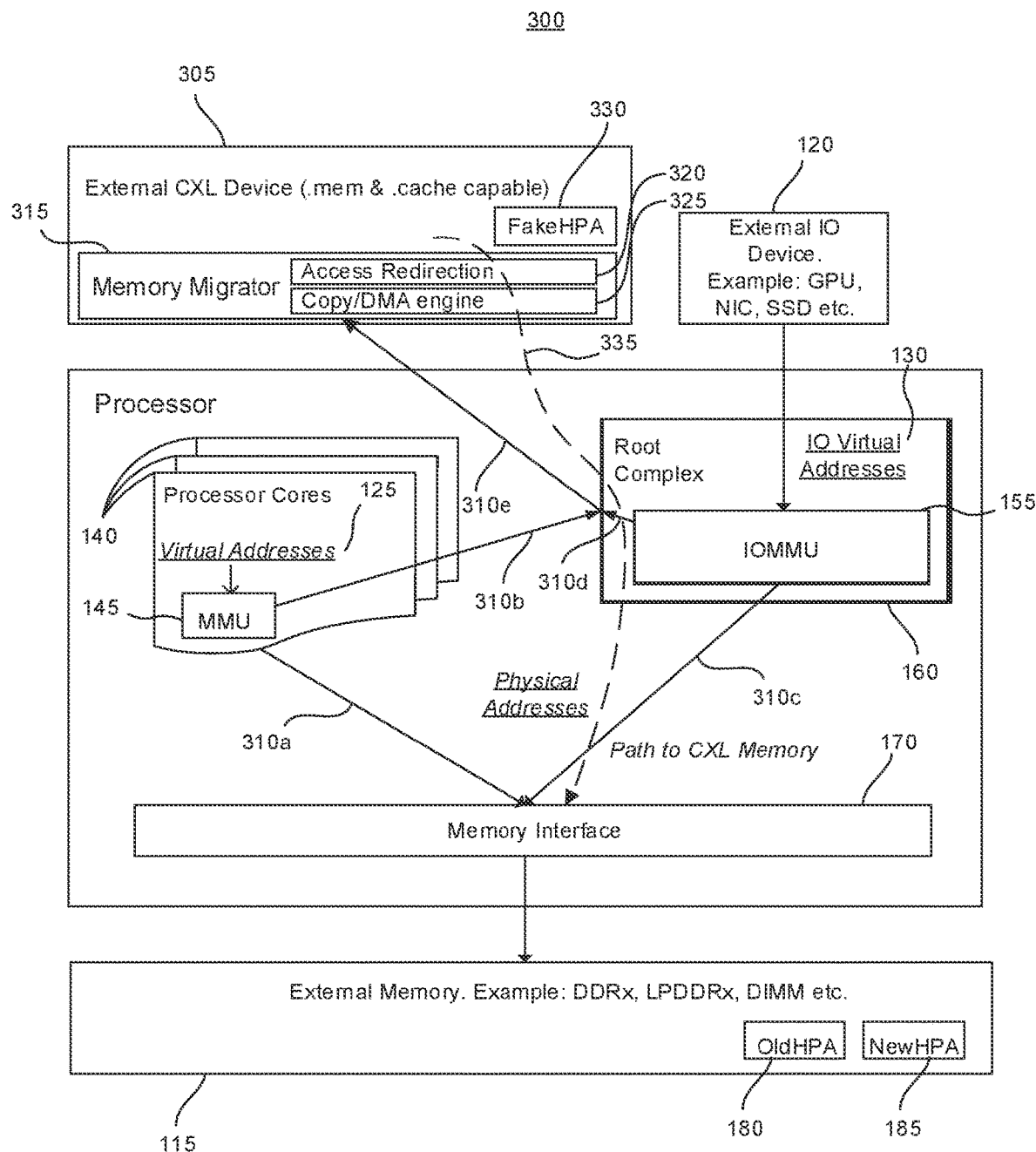
FIG. 3 is a block diagram of an example alternate computing system in which the presently disclosed technology may be implemented.

Turning now to FIG. 3, the figure is a block diagram of an example alternate computing system 300 in which the presently disclosed technology may be implemented. The illustrative embodiment of FIG. 3 is similar to the embodiment of FIG. 1 with the notable exceptions that the embodiment of FIG. 3 does not include a memory migrator in processor 110, and includes a coherent-memory device 305. In the FIG. 3 configuration, only a single coherent-memory device 305 is shown, however the present technology may be implemented with one or more such coherent-memory devices. Further, in the FIG. 3 configuration the coherent-memory device 305 is a compute express link (CXL) device, although other types of coherent-memory devices may be used instead of, or in addition to, a CXL-type device. For example, a CCIX-type (cache coherent interconnect for accelerators type) device and/or a GenZ-type device may be used instead of, or in addition to, a CXL-type device.

In the computing system 300 of FIG. 3, as in the computing system of FIG. 1, the processor 110 is operable to translate virtual addresses into physical addresses. More specifically, the processor 110 is operable to generate virtual addresses 125 or receive input/output (IO) virtual addresses 130, and translate the generated virtual addresses or received virtual addresses, as the case may be, into respective physical addresses. However, in the case of computing system 300, MMU 145 is operable to translate virtual addresses 125 into first physical addresses 310a used to access memory locations in external memory 115 or into second physical addresses 310b used to access memory locations in coherent-memory device 305, and IOMMU 155 is operable to translate virtual addresses 130 into third physical addresses 310c used to access memory locations in external memory 115 or into fourth physical addresses 310d used to access memory locations in coherent-memory device 305. Further, when accessing external memory 115 using the physical addresses 310a and 310c, access is through memory interface 170; whereas when accessing the coherent-memory device 305 using physical addresses 310b and 310d, access is through root complex 160. The second physical addresses 310b and fourth physical addresses 310d are collectively referred to as coherent-memory device physical addresses 310e.

In the FIG. 3 configuration, memory migration without page faults is handled through a memory migrator 315 provided in the coherent-memory device 305. Such implementation may be called for when, for example, it is not possible to provide a memory migrator in the processor 110. In the FIG. 3 configuration, since there is no memory migrator in the processor 110, the redirection of physical addresses 310a and 310c like that performed in the context of FIG. 1 is not possible. In the FIG. 3 configuration, to migrate the mapping for virtual addresses corresponding to locations in external memory 115 from OldHPA to NewHPA, the access paths for such virtual addresses, either that of MMU 145 to memory interface 170 or that of IOMMU 155 to memory interface 170, are changed during the migration so that the paths pass through the memory migrator 315. In order to do this, physical addresses 310a and/or 310c of the memory to be migrated are temporarily mapped to FakeHPA (i.e., "nominal physical addresses") that are part of coherent-memory physical addresses 310e. Once the physical addresses 310a and/or 310c of the memory to be migrated are mapped to nominal physical addresses that are part of coherent-memory physical addresses 310e, a request to access a virtual address corresponding to one of such physical addresses 310a or 310c will be mapped to a coherent-memory physical address 310e (i.e., a nominal physical address), thereby directing the request to the coherent memory device 305 . . . . Upon receipt of the nominal physical memory address at the coherent-memory device 305, the memory migrator 315, may redirect the nominal physical address to the OldHPA or to the NewHPA. The nominal physical address is redirected to the OldHPA if the information associated with the virtual address has not yet been moved from OldHPA to NewHPA. The nominal physical address is redirected to the NewHPA if the information associated with the virtual address has already been moved from OldHPA to NewHPA. Moreover, when the migration is complete the mapping of the subject virtual addresses carried out in the MMU 145 and/or IOMMU 155 may be changed to map the virtual addresses to NewHPA rather than FakeHPA, so that routing through the memory migrator 315 is no longer necessary The memory migrator 315 includes an access redirection block 320 and a copy engine block 325, each taking the form of software, hardware, or a combination of software and hardware. The access redirection block 320 and copy engine block 325 may be used as part of the scheme for migrating memory that is accessible in or through coherent-memory device 305, without causing page faults. For instance, in a case of migrating information associated with a virtual address 130 originally corresponding to an old physical memory address 310c within external memory 115 (i.e OldHPA 180) to a new physical address within external memory 115 (i.e NewHPA 185), the virtual address 130 may be temporarily remapped to a nominal physical memory address 310d (i.e FakeHPA 330) by IOMMU 155, with the FakeHPA belonging to the coherent-memory device 305. To this end, the virtual address 130, that would otherwise translate into a third physical address 310c, is translated into a fourth physical address 310d, and then the fourth physical address 310d is redirected to the OldHPA by the memory migrator 315. Once the OldHPA is determined, the coherent-memory device 305 accesses the external memory 115 at the OldHPA via the root complex 160 and the memory interface 170, as represented in FIG. 3 by link 335 . . . . In this manner, the access redirection block 320 may be used to redirect the FakeHPA to an OldHPA during migration from OldHPA to NewHPA. Redirection and memory migration in the context of the FIG. 3 embodiment are discussed in more detail in connection with FIG. 4.

Figure 4:
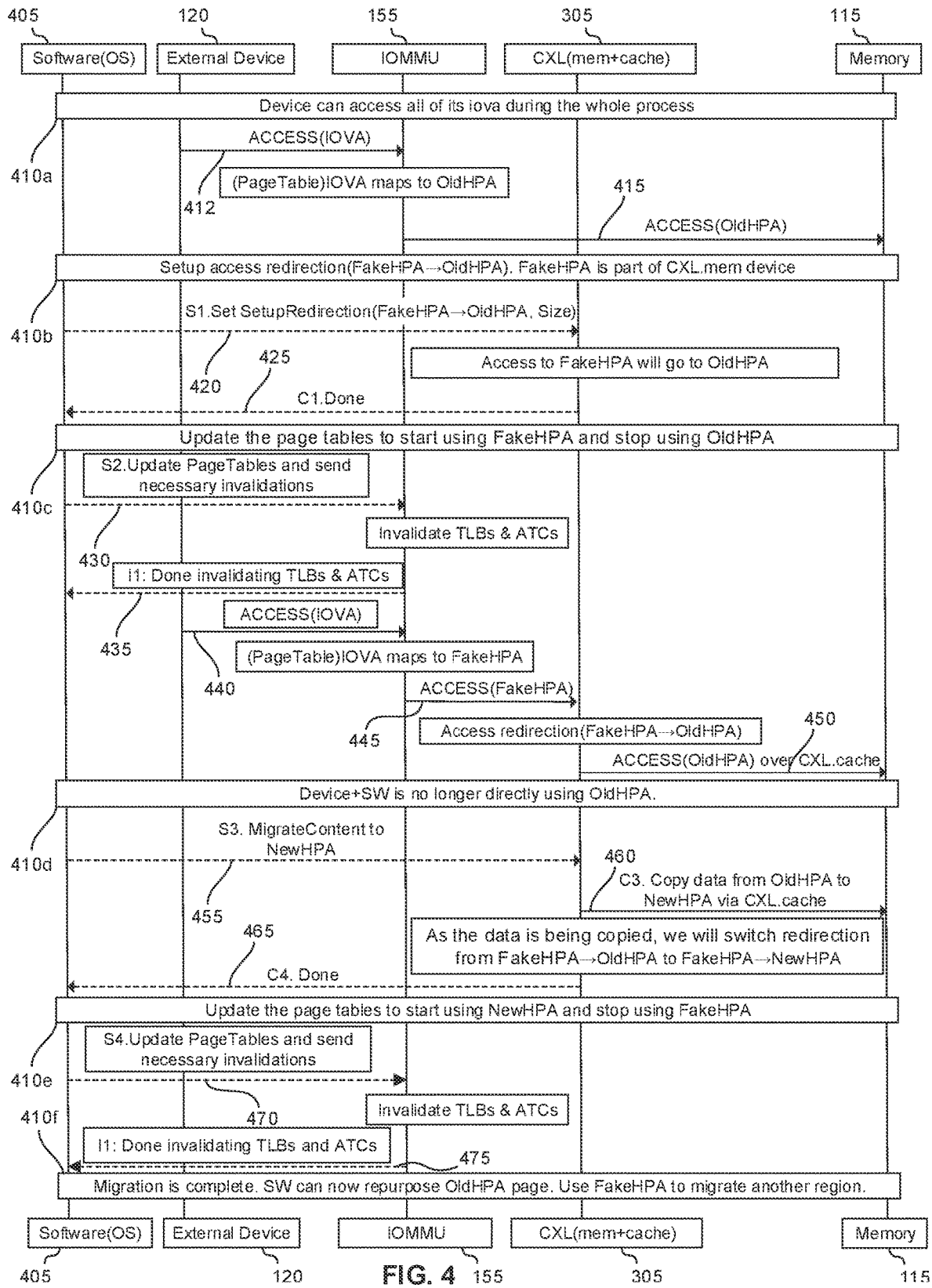
FIG. 4 is a signal flow diagram showing an illustrative flow of signals among selected elements of the FIG. 3 system before a memory migration is started, during the memory migration, and after the memory migration is complete.

FIG. 4 is a signal flow diagram showing an illustrative flow of signals among selected elements of the FIG. 3 computing system 300 before a memory migration is started, during the memory migration, and after the memory migration is complete. More specifically, FIG. 4 shows an illustrative flow of signals among operating system software 405 running on processor cores 140, external device 120, IOMMU 155, coherent-memory device 305 having memory migrator 315, and external memory or memories 115. The signal flows are depicted during a time period before migration (time period 410a), a time period during which an access redirection is set up (time period 410b), a time period during which page tables of the IOMMU 155 are updated to use FakeHPA in place of OldHPA (time period 410c), a time period when information is migrated from old memory locations, corresponding to OldHPA, to new memory locations, corresponding to NewHPA (time period 410d), a time period during which page tables of the IOMMU 155 are updated to use NewHPA in place of FakeHPA (time period 410e), and a time period when migration is complete (time period 410f). The time periods 410b, 410c, 410d, and 410e in combination define the time period of the memory migration.

Regarding the time period 410a, the external device 120 may send a virtual address to the IOMMU 155 (signal 412). The IOMMU 155 maps the received virtual address to a physical address currently assigned to the virtual address (i.e., the OldHPA) using, for example, a page table, and accesses the external memory 115 at the address indicated by OldHPA through the memory interface 170.

Next, the operating system software 405 receives or generates a command to perform a memory migration and the time period 410b begins. For instance, a command to perform a memory migration may be generated in response to user input, received from another device coupled to the processor 110, generated by the processor 110 in response to metrics received from another device or devices, or generated by processor 110 in response to processor memory monitoring operations. Moreover, the command to perform memory migration may be generated for any number of reasons, including moving frequently accessed information from low cost/low performance memory (i.e., "far memory") to high performance/high cost memory (i.e., "near memory"), moving infrequently accessed information from near memory to far memory, or moving information for purposes of memory defragmentation.

In any event, as a first step of performing the memory migration the operating system software 405 informs the coherent-memory device 305 of certain parameters for the migration. To illustrate, the operating system software 405 may inform the coherent-memory device 305 to setup redirection based on the current physical addresses from which information is to be migrated (i.e., OldHPA), nominal physical addresses which will correlate to the OldHPA during the migration (i.e., FakeHPA), and the size of the migration (signal 420). The coherent-memory device 305, in turn, informs that operating system software 405 when redirection setup is complete (signal 425). Once redirection is complete, the time period 410c begins.

As an initial operation during time period 410c, the operating system software 405 instructs the IOMMU 155 to start using the FakeHPA instead of the OldHPA. For example, the operating system software 405 instructs the IOMMU 155 to revise its page tables and invalidate certain caches (signal 430). As a more specific example, the operating system software 405 instructs the IOMMU 155 to revise its page tables to map virtual addresses to FakeHPA instead of OldHPA, and to carry out invalidations of the IOMMU 155 translation lookaside buffer (TLB) and the external device 120 address translation cache (ATC). In response, the IOMMU 155 invalidates its TLB, instructs the external device 120 to invalidate its ATC, and informs the operating system software 405 when the TLB and ATC have been invalidated (signal 435). Now, when the external device 120 sends a virtual address to the IOMMU 155 (signal 440), the IOMMU 155 maps the received virtual address to a nominal physical address assigned to the virtual address, the FakeHPA, using for example a page table, and sends the FakeHPA to the coherent-memory device 305 (signal 445). In the coherent-memory device 305, the memory migrator 315 determines the OldHPA corresponding to the FakeHPA, e.g., by using a table to cross-reference the FakeHPA to the OldHPA, and accesses the desired information in the external memory 115 at the OldHPA (signal 450).

While redirection from FakeHPA to OldHPA is active, any access to FakeHPA will be handled by the memory migrator 315. Also, for every access to FakeHPA that is redirected to OldHPA, the memory migrator 315 will take exclusive ownership of the corresponding cache line in OldHPA. This ensures cache coherency between memory accesses to OldHPA without redirection from FakeHPA and memory accesses to OldHPA with redirection from FakeHPA.

After redirection from FakeHPA to OldHPA has been set up, and the virtual addresses have been remapped to the FakeHPA, movement of information from locations indicated by OldHPA to locations indicated by NewHPA may begin. That is, time period 410d may begin anytime after the invalidations of the TLB and ATC are complete. To initiate movement of the information from locations indicated by OldHPA to locations indicated by NewHPA, the operating system software 405 instructs the memory migrator 315 of coherent-memory device 305 to copy the information (i.e., "migrate the content") from OldHPA to NewHPA (signal 455). In response, the memory migrator 315 uses copy engine 325 to copy the information from OldHPA to NewHPA, while simultaneously switching access redirection from FakeHPA→OldHPA to FakeHPA→NewHPA (signal 460). Switching access redirection for a given set of OldHPA, FakeHPA, and NewHPA is performed with the movement of the corresponding information from OldHPA to NewHPA so that the information is correctly accessed after it is moved from OldHPA to NewHPA. If the redirection from FakeHPA to OldHPA is not changed in this manner, attempted access of the information will be mistakenly directed to OldHPA.

While redirection from FakeHPA to NewHPA is active, any access to FakeHPA will be handled by the memory migrator 315. Also, for every access to FakeHPA that is redirected to NewHPA, the memory migrator 315 will take exclusive ownership of the corresponding cache line in NewHPA. This ensures cache coherency between memory accesses to NewHPA without redirection from FakeHPA and memory accesses to NewHPA with redirection from FakeHPA.

In addition, it is noted that the copying of information from OldHPA to NewHPA and the corresponding switch of access redirection may be performed atomically (e.g., on a byte-byte basis for byte-addressable memory).

In any event, upon completion of all the information movement necessary to complete the migration, and all attendant switching of access redirection, the coherent-memory device 305 sends an indication to the operating system software 405 that the migration is complete (signal 465). Once all movement from OldHPA to NewHPA is complete, the time period 410e begins.

As a first operation during time period 410e, the operating system software 405 instructs the IOMMU 155 to update its mapping of the virtual addresses from FakeHPA to NewHPA and to invalidate certain caches (signal 470). As a more specific example, the operating system software 405 may instruct the IOMMU 155 to revise its page tables to map virtual addresses to NewHPA instead of FakeHPA, and to carry out invalidations of the IOMMU 155 translation lookaside buffer (TLB) and the external device 120 address translation cache (ATC). In response, the IOMMU 155 invalidates its TLB, instructs the external device 120 to invalidate its ATC, and informs the operating system software 405 when the TLB and ATC have been invalidated (signal 475). Now, the computing system 300 operates according to time period 410f.

During time period 410f, the operation of computing system 300 is the same as the operation of computing system 300 during time period 410a, with the exception that when the external device 120 sends a virtual address to the IOMMU 155, the IOMMU 155 maps the received virtual address to NewHPA instead of OldHPA. The IOMMU 155 may then access the external memory 115 at the address indicated by NewHPA through the memory interface 170.

Embodiments of the present technology include, but are not restricted to, the following.

(1) A method for accessing information associated with a virtual memory address including receiving a virtual memory address: translating the virtual memory address into a nominal physical memory address: receiving the nominal physical memory address at a memory migrator; and using the memory migrator to determine an old physical memory address corresponding to the nominal physical memory address and access the information at the old physical memory address.

(2) The method according to (1), wherein the step of translating includes using a page table to cross-reference the virtual memory address to the nominal physical memory address.

(3) The method according to (1), wherein the memory migrator is located in a processor.

(4) The method according to (3), wherein the virtual memory address is generated in the processor.

(5) The method according to (3), wherein the virtual memory address is generated by a device external to the processor.

(6) The method according to (3), wherein the nominal physical memory address is a new physical memory address indicating a location within a memory external to the processor.

(7) The method according to (1), wherein the steps of receiving a virtual memory address and translating the virtual memory address into a nominal physical memory address are performed within a processor, the memory migrator is located in a coherent-memory device external to the processor, the nominal physical memory address is a fake physical memory address corresponding to the coherent-memory device, and the memory migrator translates the fake physical memory address into the old physical memory address.

(8) A system for accessing information associated with a virtual memory address including one or more processor cores: at least one memory management unit for receiving a virtual memory address and translating the virtual memory address into a nominal physical memory address; and a memory migrator for receiving the nominal physical memory address, determining an old physical memory address corresponding to the nominal physical memory address, and accessing the information at the old physical memory address.

(9) The system according to (8), wherein the at least one memory management unit includes at least one page table for cross-referencing the virtual memory address to the nominal physical memory address.

(10) The system according to (8), wherein the one or more processor cores, the at least one memory management unit, and the memory migrator are included in a processor.

(11) The system according to (10), wherein the nominal physical memory address is a new physical memory address indicating a location within a memory external to the processor.

(12) The system according to (8), wherein the one or more processor cores and the at least one memory management unit are parts of a processor, the memory migrator is located in a coherent-memory device external to the processor, the nominal physical memory address is a fake physical memory address corresponding to the coherent-memory device, and the memory migrator translates the fake physical memory address into the old physical memory address.

(13) The system according to (12), wherein the processor further includes a root complex coupled to the coherent-memory device.

(14) A method for performing migration of information associated with a virtual memory address from storage in an old physical memory location corresponding to an old physical memory address to a new physical memory location corresponding to a new physical memory address including revising a page table cross-referencing the virtual memory address with the old physical memory address to cross-reference the virtual memory address with a nominal physical memory address: copying the information from the old physical memory location to the new physical memory location; and when accessing the information using the virtual memory address after revising the page table and before copying the information from the old physical memory location to the new physical memory location using the page table to translate the virtual memory address into the nominal physical memory address, receiving the nominal physical memory address at a memory migrator, using the memory migrator to determine the old physical memory address based on the nominal physical memory address, and accessing the information at the old physical memory address; and when accessing the information using the virtual memory address after revising the page table and after copying the information from the old physical memory location to the new physical memory location using the page table to translate the virtual memory address into the new physical memory address or using the memory migrator to determine the new physical memory address based on the nominal physical memory address, and accessing the information at the new physical memory address.

(15) The method according to (14), wherein the memory migrator is located in a processor.

(16) The method according to (15), wherein the virtual memory address is generated in the processor.

(17) The method according to (15), wherein the virtual memory address is generated by a device external to the processor.

(18) The method according to (15), wherein the nominal physical memory address is the new physical memory address, and the new physical memory location is in a memory external to the processor.

(19) The method according to (14), wherein the step of using the page table to translate the virtual memory address into the nominal physical memory address is performed within a processor, the memory migrator is located in a coherent-memory device external to the processor, the nominal physical memory address is a fake physical memory address corresponding to the coherent-memory device, and the memory migrator translates the fake physical memory address into the old physical memory address or the new physical memory address.

(20) The method according to (19), further including the step of revising the page table to replace the fake physical memory address with the new physical memory address.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description should be taken by way of illustration rather than by way of limitation of the subject matter defined by the claims.

The invention claimed is:

1. A method for accessing information associated with a virtual memory address comprising:
receiving a virtual memory address;
translating the virtual memory address into a nominal physical memory address;
receiving the nominal physical memory address at a memory migrator; and
using the memory migrator to determine an old physical memory address corresponding to the nominal physical memory address and access the information at the old physical memory address,
wherein the steps of receiving a virtual memory address and translating the virtual memory address into a nominal physical memory address are performed within a processor, the memory migrator is located in a coherent-memory device external to the processor, the nominal physical memory address is a fake physical memory address corresponding to the coherent-memory device, and the memory migrator translates the fake physical memory address into the old physical memory address.

2. A system for accessing information associated with a virtual memory address comprising:
one or more processor cores;
at least one memory management unit for receiving a virtual memory address and translating the virtual memory address into a nominal physical memory address; and
a memory migrator for receiving the nominal physical memory address, determining an old physical memory address corresponding to the nominal physical memory address, and accessing the information at the old physical memory address,
wherein the one or more processor cores and the at least one memory management unit are parts of a processor, the memory migrator is located in a coherent-memory device external to the processor, the nominal physical memory address is a fake physical memory address corresponding to the coherent-memory device, and the memory migrator translates the fake physical memory address into the old physical memory address.

3. The system according to claim 2, wherein the processor further comprises a root complex coupled to the coherent-memory device.

4. A method for performing migration of information associated with a virtual memory address from storage in an old physical memory location corresponding to an old physical memory address to a new physical memory location corresponding to a new physical memory address comprising:
revising a page table cross-referencing the virtual memory address with the old physical memory address to cross-reference the virtual memory address with a nominal physical memory address;
copying the information from the old physical memory location to the new physical memory location; and
when accessing the information using the virtual memory address after revising the page table and before copying the information from the old physical memory location to the new physical memory location:
using the page table to translate the virtual memory address into the nominal physical memory address,
receiving the nominal physical memory address at a memory migrator,
using the memory migrator to determine the old physical memory address based on the nominal physical memory address, and
accessing the information at the old physical memory address; and
when accessing the information using the virtual memory address after revising the page table and after copying the information from the old physical memory location to the new physical memory location:
  using the page table to translate the virtual memory address into the new physical memory address or using the memory migrator to determine the new physical memory address based on the nominal physical memory address, and
  accessing the information at the new physical memory address.

5. The method according to claim 4, wherein the memory migrator is located in a processor.

6. The method according to claim 5, wherein the virtual memory address is generated in the processor.

7. The method according to claim 5, wherein the virtual memory address is generated by a device external to the processor.

8. The method according to claim 5, wherein the nominal physical memory address is the new physical memory address, and the new physical memory location is in a memory external to the processor.

9. The method according to claim 4, wherein the step of using the page table to translate the virtual memory address into the nominal physical memory address is performed within a processor, the memory migrator is located in a coherent-memory device external to the processor, the nominal physical memory address is a fake physical memory address corresponding to the coherent-memory device, and the memory migrator translates the fake physical memory address into the old physical memory address or the new physical memory address.

10. The method according to claim 9, further comprising the step of revising the page table to replace the fake physical memory address with the new physical memory address.

* * * * *